(12) United States Patent
Rodrigues (10) Patent No.: US 7,739,447 B1
(45) Date of Patent: Jun. 15, 2010

(54) ONLINE LABEL MAINTENANCE

(75) Inventor: Steven Rodrigues, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 430 days.

(21) Appl. No.: 11/112,622

(22) Filed: Apr. 22, 2005

(51) Int. Cl.
*G06F 12/00* (2006.01)
*G06F 11/00* (2006.01)

(52) U.S. Cl. ............... 711/114; 711/163; 711/E12.007; 714/8; 714/E11.015

(58) Field of Classification Search ............ 711/114, 711/163; 714/8
See application file for complete search history.

(56) References Cited

U.S. PATENT DOCUMENTS

| | | | |
|---|---|---|---|
| 6,397,347 B1 * | 5/2002 | Masuyama et al. ............. | 714/5 |
| 2002/0062422 A1 * | 5/2002 | Butterworth et al. ......... | 711/114 |
| 2002/0162057 A1 * | 10/2002 | Talagala ....................... | 714/54 |
| 2003/0023825 A1 * | 1/2003 | Woo et al. .................... | 711/170 |
| 2003/0046470 A1 * | 3/2003 | Sivertsen ..................... | 710/304 |
| 2003/0182494 A1 * | 9/2003 | Rodrigues et al. ........... | 711/100 |
| 2006/0075283 A1 * | 4/2006 | Hartung et al. ................ | 714/5 |

* cited by examiner

*Primary Examiner*—Reginald G Bragdon
*Assistant Examiner*—Aracelis Ruiz
(74) *Attorney, Agent, or Firm*—Blakely, Sokoloff, Taylor & Zafman LLP (57) ABSTRACT

One or more parts of a storage system may be serviced while the storage system is online. A storage device may be unincorporated from the storage system while maintaining the storage system active. Access to the storage system may continue unaffected, except for the unincorporated section of the storage system, for example, the storage device and possibly other storage devices. Service may be performed on the unincorporated section of the storage system, and the unincorporated section be incorporated back into the storage system.

25 Claims, 7 Drawing Sheets

ONLINE LABEL MAINTENANCE

FIELD

Embodiments of the invention relate to storage systems, and more particularly to servicing a storage system while the system is in an operational mode.

BACKGROUND

A storage server is a special-purpose processing device used to store and retrieve data on behalf of one or more client devices ("clients"), which may access and/or process the data. A storage server can be used, for example, to provide multiple users with access to shared data or to backup mission critical data.

A storage server may provide different levels of access to data. For example, a file server is an example of a storage server that provides file-level access to data. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). The data may be organized, managed, and/or accessed as data files. Another example of a storage server may be a device that provides clients with block-level access to stored data, rather than file-level access. The data in such a system may be organized and managed and/or accessed as data blocks, which may include more or less information than a file. Also, a storage server may be able to provide clients with both file-level access and block-level access.

A storage server may have access to multiple mass storage devices, or persistent/non-volatile storage devices, which may be managed based on logical or virtual organization. For example, a storage server may represent a group of storage devices (e.g., hard disks) as a logical aggregate of storage devices. The aggregate may be managed to store data in volumes contained within the aggregates. They may in turn be further logically broken down into plexes containing RAID groups. The RAID groups may have multiple disks. While particular terminology is used herein as a reference point to describe particular organizations and/or functions herein, the terminology shall not be construed as limiting, but rather by way of example. Where particular terminology is referred to (e.g., an aggregate, a plex), these are to be understood as merely examples of data structure abstractions that may be substituted with equivalent or similar data structures that may be referred to by other terms.

Data storage can be organized into multiple layers of abstraction to provide fault tolerance, as individual disks can (and do) fail. The abstraction layers also allow a volume or aggregate to store larger quantities of data than can fit on a single disk. However, having multiple disks in a single volume creates the problem of keeping track of which disks are part of which RAID groups, plexes, and aggregates, especially as disks are added and failed out of the aggregates. A disk or other storage device may have a dedicated area to provide a RAID label and/or other metadata to provide the ability to track the disk and determine which disks belong to which RAID groups, plexes, and aggregates. The process of determining the logical data structure to which a disk belongs may be referred to as "RAID assimilation." Details regarding RAID Assimilation and RAID labels may be found in U.S. patent application Ser. No. 10/105,872, filed on Mar. 20, 2002, and entitled "RAID Assimilation Method and Apparatus," by Steven Rodrigues and Dave Hitz.

Sometimes a RAID label or metadata in a disk defining the disk's logical data structure associations can become corrupted (e.g., out of date, having unexpected values, having incorrect data, etc.), causing the disk to be treated as either a "broken disk" and/or causing the disk to be lost from the aggregate with which it is associated. If a disk is determined to be physically sound, the disk label may be declared "out of date," and the disk may be turned into a "hot spare" in the system. If either the disk is physically damaged or the disk is physically sound but its label information is corrupted, the disk may not be available to its associated RAID group (e.g., the RAID group that contained the disk). If a RAID group loses a threshold number of disks, the RAID group and its associated plex are rendered inoperable. In certain cases, if the label data is not just out-of-date but has unexpected values, the disk's aggregate may be marked as "failed assimilation," meaning the aggregate is unable to be assimilated into the system for availability for serving data. In this case the aggregate may be taken out of service. In all of these scenarios, the data stored on the aggregate is unavailable to users.

Recovering this data often requires users to modify the RAID labels of affected disk(s). Traditionally, modification of RAID labels involved the use of several system management commands to examine and modify the data in the RAID labels of individual and multiple disks. However, to run these commands, the system was traditionally required to be in a mode where it neither assumed that the RAID labels of disks were in any particular state, nor attempted to modify the state of the RAID labels on disks. Such an operating mode may be referred to as a maintenance mode, in which the system does not persistently recognize or act on RAID groups, plexes, aggregates, or volumes. The system may recognize or act on such structures in maintenance mode if a management command needs to operate on one of these structures or entities. If a command specifies operation(s) on one of these entities, the code implementing that command may run assimilation code to determine the makeup of RAID groups, plexes, and aggregates, perform the operation(s), and then reverse the assimilation. Reversing the assimilation causes the system to cease to recognize the RAID groups, plexes, and aggregates in between commands. For example, if a data access command were received for data on a disk in maintenance, the system would not know to what RAID group the disk belongs. This allows service personnel to examine the state of the RAID labels, modify the RAID labels, examine the new state of the system, and continue modifying the RAID labels until the system is again operable.

From the foregoing it will be understood that in maintenance mode user access to data stored in volumes on the storage server is curtailed. Thus, running the system in maintenance mode reduces data availability. Further, because placing the system into maintenance mode and restoring the system from maintenance mode typically have required rebooting the system, there may be a significant performance cost associated with the transitions related to use of a maintenance mode. Note that a system including multiple aggregates may have some aggregates that are operable and could be serving data, except for the bad luck of being on a system that had to be placed into maintenance mode to deal with an aggregate with one or more faulty disks. From a practical standpoint, attempts to recover lost data volumes are typically performed at off-hours because of the cost of making the unrelated volumes unavailable for access, resulting in costly overtime for service personnel and extending the data unavailability period for the down aggregates.

SUMMARY

One or more parts of a storage system may be logically isolated form a storage system, and serviced while the storage system is online. Service may be performed on the unincorporated section of the storage system, and the unincorporated section can be incorporated back into the storage system.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

A "virtual maintenance mode" may be provided for a system having multiple aggregates, or logical data containers for storing data across multiple physical resources (e.g., disks). If the aggregate containing a system root volume is operable, a virtual maintenance mode may allow a system to place disks/volumes in a mode where the system neither assumes that metadata labels on the disks are in any particular state, nor attempts to modify the state of the disks. This may be accomplished while leaving other disks/volumes in a normal operating mode (organized in RAID groups, plexes, and aggregates, and containing volume data). Thus, unlike traditional approaches, only aggregates affected by an unavailable/unusable disk may be placed in a maintenance mode, and operable aggregates may continue to provide data services while maintenance is performed on the affected aggregate(s). A disk may be considered to be unavailable or unusable if it fails to respond to queries, access requests, status checks, etc. for a length of time, or in a timely manner. The length of time, or the timeliness of a response may be determined according to an application in which the disk is used, the type of disk, the type or purpose of the system in which the disk is found, etc., and may include an application, transaction, and/or operation timeout. Furthermore, once maintenance operations on a disk or collection of disks have finished, the disks can be reintroduced into the system in a normal operating mode and be organized into RAID groups, plexes, and aggregates. These reintroduced resources may serve data as if they had been newly added to the system, with no need for a system reboot.

In one embodiment a disk may be placed in a maintenance state through an existing assimilation framework in a storage server system. The technology to provide the un-assimilation of disks may be provided by a component/module of a storage server system that can view the physical storage resources and affect the logical groupings of the disks. For example, in one embodiment the disk may be placed in the maintenance state while the system is online by use of clustering technology available to the storage server, which may include the ability to un-assimilate a disk from the system while it is still attached physically and visible to the system. Un-assimilating a disk may refer to a RAID subsystem removing some or most of the data structures related to a disk or collection of disks, for example, RAID groups, plexes, aggregates, etc. The system may include the ability to dynamically assimilate disks whenever the system is operational. Dynamic assimilation provides the ability to reintroduce the disk back into the system and establish aggregates and other data structure organization abstractions on the fly. Thus, when the system has finished performing maintenance on a collection of disks, they may be brought back online without the need to reboot, or restart operation of the system.

In one embodiment a disk or disks selected for virtual maintenance may be indicated by a flag located in a persistent data structure referencing the disk(s). The persistent data structure may exist as long as a system filer (or other storage server), or entity responsible for data structure organization, is running and the disk is attached to the system. The flag may be set upon determining that a disk is unusable (e.g., as a storage resource) due to lost or corrupted label data or metadata. Label data or metadata may be considered corrupted if, for example, it is out of date, refers to a nonexistent data structure, has unexpected values, has incorrect data, etc. As part of an operating routine, such as a routine defined in operating software, the filer may check the persistent data structure for flags set, and un-assimilate any marked disks. For example, many filers perform a "cluster giveback," where particular determined disks are unassimilated. A similar or same process may be used to un-assimilate a flagged disk. Note that where description is made in reference to a filer, other types of storage servers could be used, and the term filer is used only for purposes of describing one possible implementation. In some systems, a filer may generically refer to a storage server, and provide both file-based, as well as block-based data access.

Un-assimilating a disk may refer to the filer destroying logical group data structures to which the disk belongs, for example, aggregates, plexes, RAID groups. Other disks may not be related, or have associations with other disks (e.g., spares, broken disks), and the disk data structures may be removed from group data structures. In one embodiment the current state of an unassimilated disk may be altered. For example, a disk may normally have a state (e.g., filesystem disk, spare disk, broken disk, in-use, etc.), which is set to an "unknown" state. In one embodiment an unknown state refers to a separate valid state recognized by the filer, for which object properties may be associated. In an alternate embodiment, an unknown state refers to an invalid state identifier, which renders the disk unknown to the filer. In an unknown state, whether as a separate valid state, or as the lack of a valid state, an assimilation function/module may pass over the unassimilated disk and not add the disk to the system. Thus, even though the disk may be visible as a physical resource to the system, the disk may be effectively isolated from the system. An isolated disk, or storage device, may thus refer to a disk that is part of a system, but is not accessible for storage functions, for example, client requests to read or write of data. The system may be able to "view" the disk, but be temporarily unable to use it as a storage resource in the storage subsystem.

The virtual maintenance system may operate on an isolated disk without affecting the rest of the system. Thus, label maintenance commands, similar to commands that may be used in traditional system-offline maintenance, can be run to attempt to correct errors that prevented the disk from being usable. Simple commands may be performed on isolated disks with little to no implementation issues. Simple commands may be those that can operate on a disk without access to higher levels of data structure abstraction (e.g., single disk commands, label editing). Other maintenance commands may need access to one or more RAID data structures, and/or operate on multiple disks at once. These more complex commands may need access to higher levels of data structure abstraction (e.g., RAID group commands, commands affecting aggregates). To perform properly, these commands may need assimilated disks in stable data structures. Assimilated disks in this context may refer to disks organized in data structures (e.g., RAID groups). Stability refers to concept that throughout the entire operation of the command, the data structure should remain intact, and only change in response to operation of the command. Performing these commands may operate on the label data or metadata of a disk to edit, modify, alter, or otherwise service the disk or the data on the disk.

In traditional, offline maintenance mode, disks may be assimilated into a special state, the data structures modified and the results written back to the disks. The data structures created by the assimilation into the special state are then completely removed. In online, virtual maintenance mode, the system may run in normal operating mode, with only certain parts of the system unavailable. Thus, most of the disks in the system may already be assimilated into dynamic data structures that can change at any time. These data structures cannot be modified or destroyed by the virtual maintenance mode commands without interrupting file service and possibly destroying or losing user data. In addition, new disks can arrive in the system at any time, and should be dynamically integrated (assimilated) into the system to preserve normal operating mode. Thus, in one embodiment the system assimilation process is modified to provide a different set of features to enable online, virtual assimilation for maintenance, while continuing to provide normal system functionality to allow for dynamically changing data structures.

The assimilation process may include one or more of the following modifications. In addition, the following is merely representative of possible modifications, and cannot be understood as a complete list of all modifications possible on the assimilation features of a storage system. In one embodiment the assimilation process dynamically assimilates on insertion only newly-arrived disks in the system, without assimilating disks in online maintenance. For maintenance commands that require a data structure (i.e., a command that operates on a data structure), assimilation into a "special" state can be achieved by limiting assimilation of the disks necessary for the command, and not assimilating other disks. As one example, the flags referred to earlier could be used for this purpose.

After the command is completed, the data structures created by dynamically assimilating disks in virtual maintenance should be removed, similar to what occurs in traditional offline maintenance. The system may identify data structures corresponding to disks in maintenance, and remove these data structures without disrupting the data structures of disks not in maintenance. These changes, and other similar changes that could be conceived, may allow any commands formerly only operable in offline maintenance to be run in the online virtual maintenance mode on selected disks. Furthermore, given that the system is assumed to operate on disks recognized by the dynamic assimilation feature and bring those disks online, a disk may be brought back out of virtual maintenance by changing its state from an unknown state to a known state. In the known state, the dynamic assimilation feature may be able to detect and automatically incorporate disks into the normally running system. Maintenance operations are complete without ever having to halt or reboot the system, or take operable aggregates offline.

Descriptions of certain details and implementations follow. Reference may be made herein to an "embodiment," which may be understood as describing a particular feature, structure, or characteristic included in at least one embodiment of the invention. Thus, the appearance of phrases such as "in one embodiment," or "in alternate an embodiment" may describe various embodiments and implementations of the invention, and may not necessarily all refer to the same embodiment.

Figure 1:
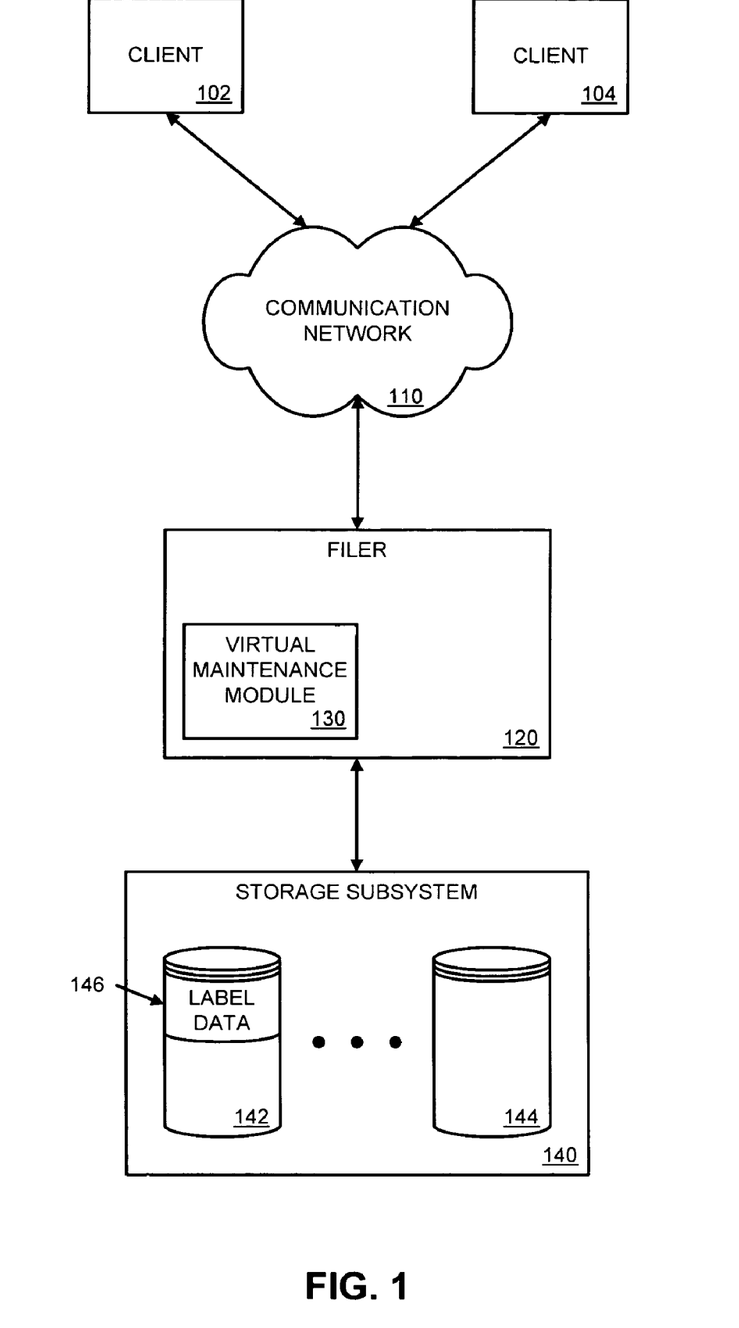
FIG. 1 is a block diagram of an embodiment of a storage system having a filer with a virtual maintenance module.

FIG. 1 is a block diagram of an embodiment of a storage system having a filer with a virtual maintenance module. A filer 120 illustrates an example of a storage server with a virtual maintenance module 130. The filer 120 may provide file-level services, as with traditional file servers, and alternately, or in addition, may provide block-level services. Thus, the filer 120, as used herein, may refer to a storage server that provides file-based (e.g., NAS (network attached storage)) services, or alternatively, or in addition, a storage server that provides block-based (e.g., SAN (storage area network)) services. The data services, whether file-level or block-level, may include providing access to a storage subsystem 140, for either data storage and/or data retrieval.

The filer 120 may be coupled locally to the storage subsystem 140, which includes one or more mass storage devices 142-144. The mass storage devices 142-144 in the storage subsystem 140 may be, for example, conventional magnetic disks (e.g., hard disks), optical disks such as CD-ROM or DVD based storage, magneto-optical (MO) storage, and/or any other type of non-volatile storage devices suitable for storing large quantities of data. The filer 120 may include one or more connectors and/or connection ports with which to couple to the storage subsystem 140. The connectors and/or ports may be connection points for fiber channel, coaxial cable, twisted-pair communication lines, and/or secure wireless connections. The filer 120 manages the storage subsystem 140, including receiving and processing read and/or write requests to data stored in the storage subsystem 140, maintaining data structures, organizing the physical resources of the storage subsystem 140 into logical storage resources, etc.

In one embodiment the mass storage device 142 is shown having label data 146. The label data 146 may include one or more values, data structures, pointers, etc., to indicate a logical association of the mass storage device 142 with other mass storage devices. Thus, the label data 146 may represent metadata stored on the mass storage device 142 to indicate a place of the mass storage device 142 in the physical resource logical organization. The label data may indicate a data structure to which the mass storage device 142 belongs.

The filer 120 may also be coupled to one or more clients 102-104 through a communication network 110. Communication network 110 may be, for example, a local area network (LAN). Each of the clients 102 and 104 may be a conventional desktop computer, a laptop, workstation, a network server, etc. The clients 102 and 104 may generate requests for access to data on the storage subsystem 140. The filer 120 may provide the requested functions to the clients 102 and 104, depending on what request is made, what permissions the client has, etc.

The filer 120 may have a distributed architecture. Thus, in one embodiment the filer 120 may include a separate N- ("network") blade and a D- ("disk") blade (neither shown in FIG. 1). In such an implementation the N-blade couples the filer 120 to communication network 110 to communicate with the clients 102-104, and the D-blade includes the file system/storage management functionality and couples the filer 120 to the storage subsystem 140 to communicate with the corresponding storage resources. The N-blade and D-blade communicate with each other using an internal protocol. Alternatively, the file server 2 may have an integrated architecture, where the network and data components are contained within a single box and/or single circuit component/manufacture. The filer 120 further may be coupled through a switching fabric to other similar filers/file servers (not shown), each having its own local storage subsystem. In this way, one or more storage subsystems can form a single storage pool, to which a client of any of the file servers may be provided access.

Figure 2:
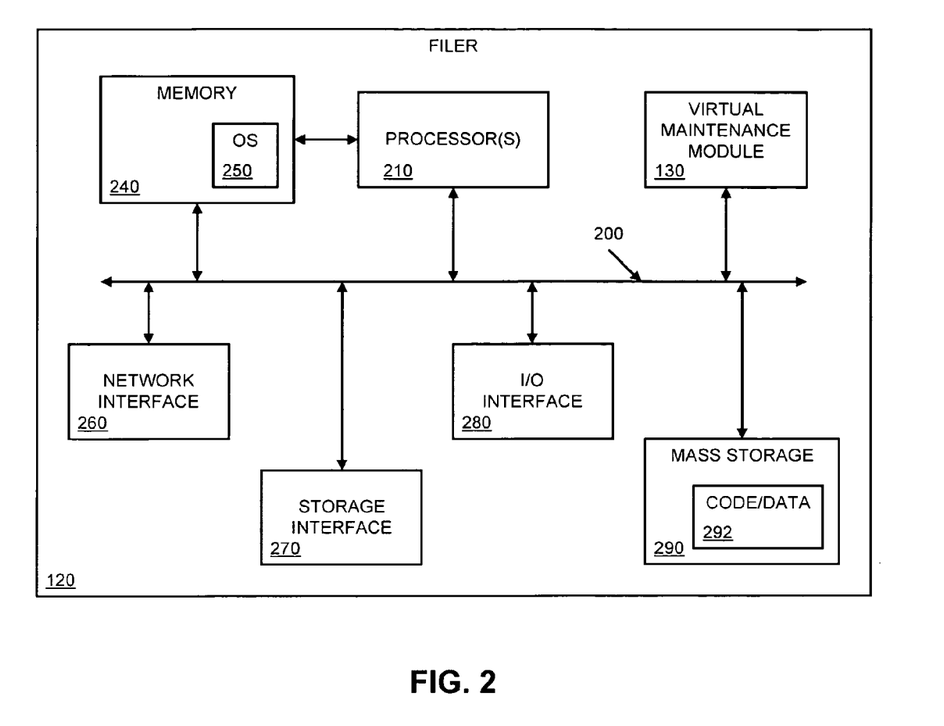
FIG. 2 is a block diagram of an embodiment of a filer.

FIG. 2 is a block diagram of an embodiment of a filer. The filer 120 may include other components/subparts in addition to what is depicted in FIG. 2. Thus, the filer 120 may be more complex than what is shown. The filer 120 includes one or more processors 210, and a memory 240 coupled to the processor 210. The processor may include any type of microprocessor, central processing unit (CPU), processing core, etc., suitable for executing the functions of the filer 120 within the performance criteria determined for the system design. The processor 210 controls the overall operation of the filer 120, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 240 may represent the main memory of the filer 120, and may provide temporary storage for code (e.g., software routines or series of instructions, commands, operations, programs, data, etc.) to be executed by the processor 210. The memory 240 may include read-only memory (ROM), flash memory, one or more varieties of random access memory (RAM), or the like, or a combination of such devices. The memory 240 stores, among other things, an operating system (OS) 250 that provides one or more functions of the filer 120. The OS 250 may include one or more functions for performing virtual maintenance, as described herein.

In one embodiment the filer 120 includes a virtual maintenance module 130. The virtual maintenance module 130 depicted in FIG. 2 is an abstraction to represent the one or more functions provided by the filer 120 to perform maintenance on certain disks while the system is online. These functions may be provided as a separate module, as shown, or may be provided by the OS 250. Thus, the virtual maintenance module 130 is to be understood as merely illustrative of the functionality provided to manage a storage subsystem/system, and is not limited to a particular implementation. The virtual maintenance module 130 could be provided as a programmable circuit component coupled to the system bus 200, as part of the OS 250, as part of an application/program executing on top of the OS 250, or some combination of these.

The processor 210 and the memory 240 may be coupled to a bus system 200. The bus system 200 is an abstraction that represents any one or more separate physical buses, communication lines/interfaces, and/or point-to-point connections, connected by appropriate bridges, adapters, and/or controllers. Therefore, the bus system 200 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Also coupled to the processor 210 through the bus 200 are a network interface 260, a storage interface/adapter 270, one or more input/output (I/O) interface(s) 280, and one or more internal mass storage device(s) 290. The network interface 260 provides the filer 120 with the ability to communicate with remote devices (e.g., clients) over a network and may be, for example, an Ethernet adapter. The storage interface 270 enables the filer 120 to access a storage subsystem and may be, for example, a Fibre Channel adapter, a SCSI adapter, etc. The filer 120 may typically be accessible to electronic or computer "users" rather than human users. Thus, I/O interface 280 may include one or more interface components to connect the filer 120 with other electronic equipment, for example, custom connections, blade adapters, etc. Additionally, the filer 120 could be made to be accessible to a human user, and thus have video, audio, and/or alphanumeric interface through I/O interface 280. Internal mass storage 290 may be or include any conventional medium for storing large volumes of data in a non-volatile manner, such as one or more magnetic or optical based disks. The mass storage 290 may hold data/instructions in a persistent state (i.e., the value may be retained despite interruption of power to the filer 120). In a generic sense the mass storage 290 is a "memory," although memory 240 is the executing or operating memory to provide instructions to the processor 210. In one embodiment the mass storage 290 include code and/or data 292 that may be accessed and placed in the memory 240 for execution by the processor 210. The code/data 292 may include machine instructions to provide virtual maintenance functions.

Figure 3:
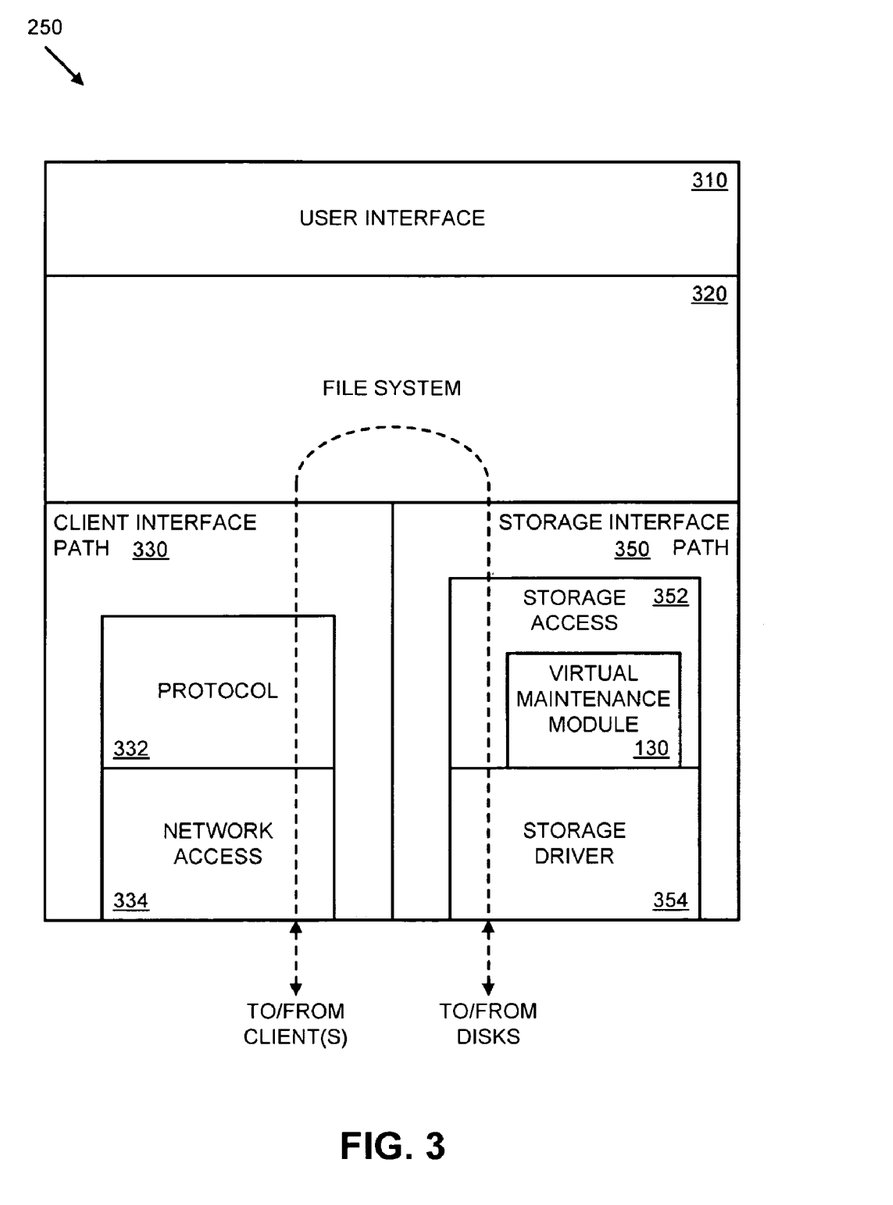
FIG. 3 is a block diagram of an embodiment of a storage server operating system.

FIG. 3 is a block diagram of an embodiment of a storage server operating system. As shown, the operating system 250 includes several modules or functional components, which may also be referred to as "layers." One layer may include a user interface 310, to provide access to a user, for example, a human user, a management system, a diagnostic server, etc. Logically below the user interface 310 may be a file system 320. The file system 320 is application-layer software that tracks/maintains a directory structure (hierarchy) of data stored in an associated storage subsystem, and manages read/write operations on the data (i.e., executes read/write operations on the disks in response to requests). Logically below the file system 320, the operating system 250 also includes a client interface path 330, and a storage interface path 350.

The client interface path 330 is depicted with a protocol layer 332 and an associated network access layer 334, to allow the file system 320 access over a network with clients. The client interface path 330 may be understood to include more components than what are depicted in FIG. 3. The protocol layer 332 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The protocol may be different for separate connections to different clients. The protocol may be established prior to operation of the system, or negotiated. The network access layer 334 includes one or more drivers or other medium-interface software routines/programs that implements a lower-level protocol to implement the protocol of the protocol layer 332 in a physical interface to communicate over the network, such as Ethernet.

The storage interface path 350 includes a storage access layer 352 and an associated storage driver layer 354, to enable the file system 320 to communicate with one or more disks and/or other storage resources in a storage subsystem. The storage interface path 350 is also to be understood as merely representative, and may include more components and/or layers than what are depicted. The storage access layer 352 implements a disk storage protocol, such as RAID, and the storage driver layer 354 implements a lower-level storage device access protocol, such as Fibre Channel Protocol (FCP) or SCSI. To facilitate the description of the following details herein, it will be assumed that the storage access layer 352 implements a RAID protocol, such as RAID-4, or RAID-DP (created by Network Appliance Inc.) and therefore may alternatively be referred to as RAID layer 352. FIG. 3 also shows a dashed line to represent a data flow path between a client and a disk, through the layers of the client interface path 330, the file system 320, and the storage interface path 350.

In one embodiment storage access layer 352 includes a virtual maintenance module 130. The storage access layer 352 may detect disks accessible through storage driver 354 and organize the disks into logical data structures. These data structures may include RAID groups, plexes, aggregates, and/or volumes. The virtual maintenance module 130 provides the ability for storage access layer 352 to selectively organize data structures. For example, virtual maintenance module 130 can provide de-assimilation functions to enable storage access layer 352 to decompose one or more data structures associated with visible disks. This may be useful to provide a maintenance mode to operate on particular disks while maintaining access to other disks in other, non-affected data structures. Assimilation functions of storage access layer 352 may be modified and/or enhanced by virtual maintenance module 130. Thus, OS 250 may be able to isolate disks under maintenance from active disks, or new disks to be incorporated into the file system 320.

Figure 4:
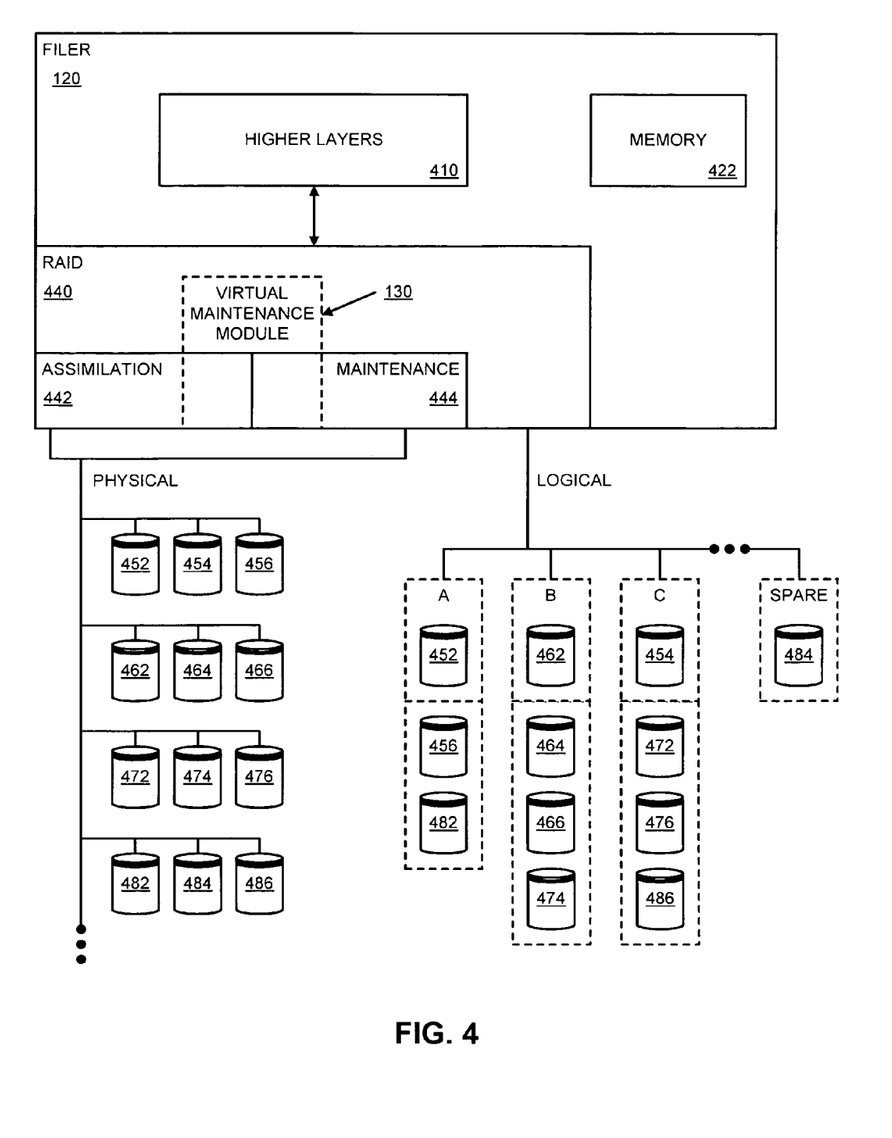
FIG. 4 is a block diagram of an embodiment of a filer having a RAID system coupled with multiple storage devices.

FIG. 4 is a block diagram of an embodiment of a filer having a RAID system coupled with multiple storage devices. The filer 120 is shown with some of the layers of an operating system. The higher layers 410 represent layers higher than RAID 440, which may be a storage access layer, as described in FIG. 3. The higher layers 410 may include, but are not limited to having, a file system and a storage server kernel. In one embodiment, the higher layers 410 include a write-anywhere file system, such as the WAFL (Write Anywhere File Layout) system of Network Appliance Inc.

In one embodiment the filer 120 includes a memory 422, which may include one or more elements of volatile or non-volatile storage. For example, the memory 422 may include RAM. The memory 422 may refer to a physical resource of the filer, or it may refer to a persistent storage resource accessible to the filer 120 that is not necessarily integrated into the filer 120. The memory 422 may include information referencing the disks 452-486, and in one embodiment the memory 422 includes storage area for flags to indicate one of the disks 452-486 should be operated on by the virtual maintenance module 130. In one embodiment the flag or flags may reference a specific disk, for example, with a label, an identifier, a pointer to another part of code, etc. Alternatively, a data structure could be in place in the memory 422, and a value in a particular location of the data structure may indicate that the virtual maintenance module 130 should operate on the disk corresponding to, or associated with, the particular location. This may also in one implementation be considered to be a database referencing the disks.

RAID 440 sees/detects the physical resources (e.g., disks) of the system and provides logical data structures. For purposes of description, and not by way of limitation, FIG. 4 will reference disks as the physical resources, and RAID groups, volumes (which may be understood as traditional, or virtual volumes), and aggregates. Other and/or additional data structures may be included within the system, and physical resources besides or in addition to disks may be used. RAID 440 provides the logical hierarchy of the system resources, and thus provides the RAID groups and aggregates.

Within RAID 440, or logically below RAID 440 may be an assimilation module 442, which may be provided with one or more code routines, functions calls, execution sequences, etc. The assimilation module 442 provides dynamic integration/incorporation of disks into the logical groups. RAID 440 may also include, or have logically below it, a maintenance feature 444. The maintenance module 444 may include one or more functions for operating on disks. The maintenance module 444 may be simply code routines for operating on the disks, and may be unaware of the logical data structures provided by RAID 440, other than how particular input parameters about particular disks may affect the operation of the commands. Thus, the assimilation module 442 and the maintenance module 444 may be considered to be disk interface layers that are able to read, write, and/or operate on the disks to provide physical mapping, and may be unaware of logical organizations.

Thus, off of these layers is seen a physical representation of disks 452-486. The number of disks and the organization of the disks are merely illustrative, and is not to be understood as necessary or typical. In one embodiment the physical layout of disks may be that each group depicted represents disks on a shelf of a rack-mounted storage system. Thus, disks 452-456 may represent one shelf, disks 462-466 a different shelf, and so forth.

From the physical to logical mapping presented by the assimilation module 442 and the maintenance module 444, RAID 440 may provide a logical view of the physical resources to the higher layers 410 of the filer 120. Thus, the filer 120 may "see" the physical resources as represented in the logical view, with the disks allocated for storage. The particular allocation of the physical resources may not be significant to the filer 120, which will simply provide storage services to clients based on what resources are seen as available for the clients. In one embodiment, as shown, RAID 440 may provide three aggregates or volumes, A, B, and C. Note that each aggregate A, B, and C may include a parity disk (disk 452 in A, disk 462 in B, and disk 454 in C), and multiple data disks. The system may also include a spare disk 484, for use in known "hot spare" operations that will not be described in detail herein.

Consider the logical data structures of FIG. 4, and then consider an error that resulted in the corruption of label data on the disks 452-456. Among other potential causes, such an error could be the result, for example, of a hardware failure and subsequent replacement of hardware, of the disks 452-456 losing their disk configuration information in conjunction with a disk firmware update, etc. A RAID group may also be affected, for example, if a disk experienced a minor error (e.g., a media error) that resulted in a disk failure, and during reconstruction of the failed disk another disk in the group failed, leaving multiple disks in the same group that are failed. For whatever cause, if the disks 452-456 were suddenly unusable, in traditional systems the entire system would need to be taken down, or offlined, and maintenance performed. However, in this case the filer 120 includes virtual maintenance module 130. Virtual maintenance module 130 may be considered a separate logical entity, or alternatively, it may simply be a representation of modifications to features already available to the filer 120 through the assimilation module 442 and/or the maintenance module 444. Note that the virtual maintenance mode may still be unable to reconstruct logical disk organizations in the case of some hardware failures.

If the disks 452-456 were to become unusable, it would affect aggregates A and C, which include disks from the same physical group. However, RAID 440 may consider that aggregate C will only lose a single disk, and may hot swap the spare disk 484, so that aggregate C would be rendered operable again, with disks 484, 472, 476, and 486. Data reconstruction and/or other routines may be performed so that service by aggregate C may remain unaffected despite the loss of disk 454. Disk 454 may in turn be switched out to the spare disk for the system, provided it is visible.

However, note that the loss of the disk group may render aggregate A inoperable, because it causes the aggregate A to lose two disks (452 and 456). In one embodiment RAID 440 may maintain access to aggregates B and C, which may continue to function in spite of the disk failures. Rather than taking down the entire system, virtual maintenance module 130 may invoke a virtual maintenance mode for the disks associated with the aggregate A. Maintenance operations may be performed on the aggregate A, through virtual maintenance module 130 and the maintenance module 444, while the aggregates B and C continue to operate in normal mode. Assuming the maintenance can successfully cure label data or metadata problems associated with disks 452, 456, and 482, the disks can be taken out of virtual maintenance mode and re-assimilated back into the system. This can be performed without a system reboot, and all while providing data services through the unaffected aggregates.

Figure 5:
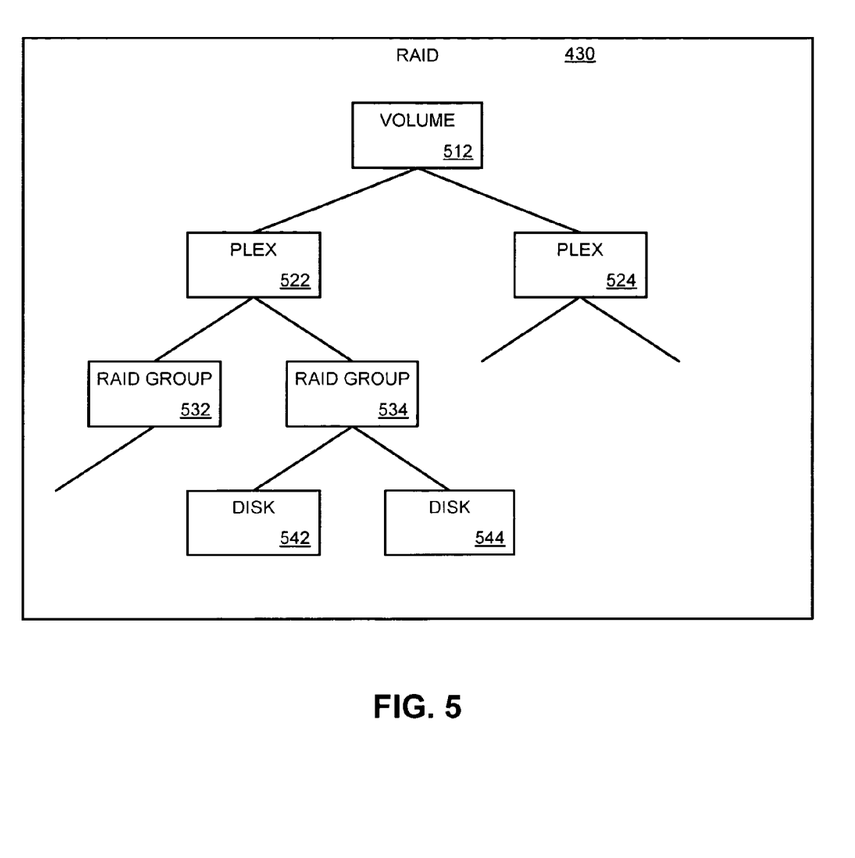
FIG. 5 is a block diagram of an embodiment of a RAID controller.

FIG. 5 is a block diagram of an embodiment of a RAID controller. RAID controller 430 provides a logical view of physical storage resources to organize the physical resources into data structures for access by higher layers of a filer operating system and/or application. In one embodiment the code implementing the RAID controller 430 provides a logical tree structure of objects that have particular attributes as is understood by those familiar with object-oriented programming. Generally, objects include elements or entities defined in software as having particular traits. They may refer to values or data structures that are operated on by a system according to their traits. A highest-level object, at a highest layer of abstraction may be a volume or an aggregate. Aggregates may include volumes. Virtual or flexible volumes may be provided for added flexibility in providing data structures. The aggregates and their associated volume(s) may be composed of plexes. Thus, volume 512 is shown having plexes 522 and 524. The number of objects making up each higher layer may be implementation specific, and other arrangements than those shown may be contemplated.

The plex 522 may in turn include several RAID groups 532 and 534. The RAID groups 532 and 534 may each include a parity disk and one or more data disks. Thus, the RAID group 534 is shown with disks 542 and 544. The RAID controller 430 was previously described as having a virtual maintenance module 130, which could provide functions to de-assimilate disks and perform maintenance on selected disks while leaving the remainder of the system operational. Consider if the disk 542 became unusable because of missing, outdated, or corrupted label data. RAID controller 430 may disassociate object disk 542 from object RAID group 534, which may invalidate object RAID group 534, and in turn invalidate objects plex 522 and volume 512. Thus, the data structure including the disk 542 would be logically "destroyed" and disk 542 may be marked for maintenance. The other disks (e.g., 544) may likewise be unusable for normal operation, and may be considered usable to virtual maintenance module 130 for multi-disk maintenance commands, as described previously. After correcting any label data problems, the disks 542 and 544 may be assimilated back into the system, and a data structure created incorporating the disks.

Figure 6:
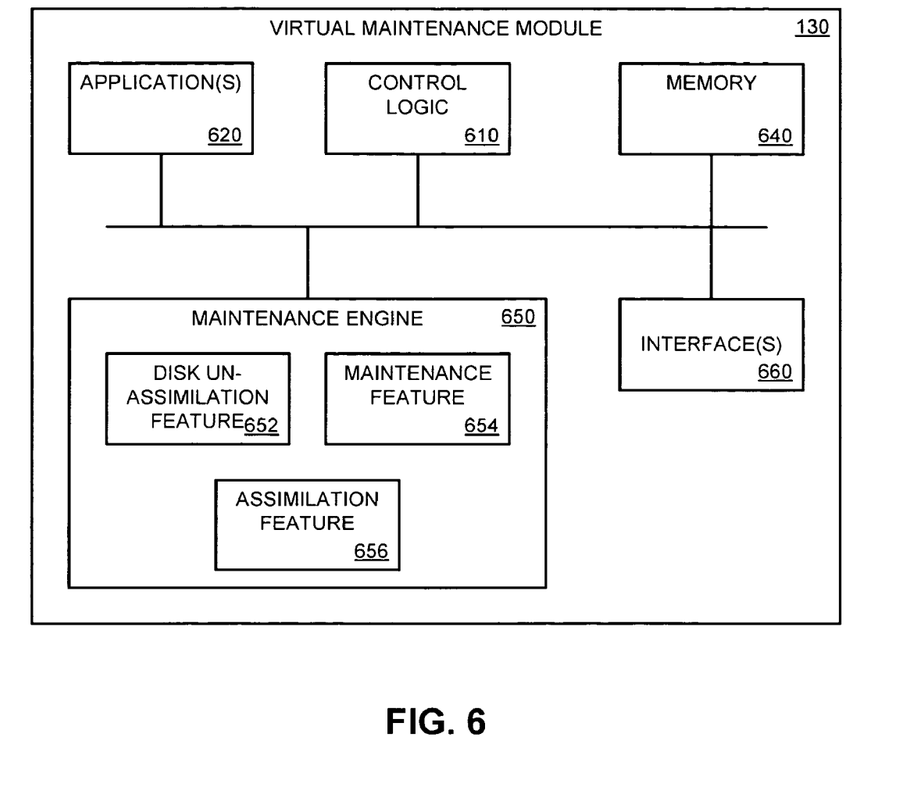
FIG. 6 is a block diagram of an embodiment of a virtual maintenance module.

FIG. 6 is a block diagram of an embodiment of a virtual maintenance module. The virtual maintenance module includes control logic 610, which represents logical functional control to direct operation of the module 130, and/or hardware associated with directing operation of the module 610. In one embodiment the module 130 includes one or more applications 620, which represent code sequence and/or programs that provide instructions to the control logic 610. The module 130 may include a memory and/or access to a memory resource 640 for storing data and/or instructions. The module 130 may also include one or more interfaces 660, which represents access interfaces to the module 130 from entities (electronic or human) external to the module 130.

The module 130 also includes a maintenance engine 650, which represents one or more functions that enable the module 130 to provide virtual maintenance. The may include one or more a disk un-assimilation feature 652, a maintenance feature 654, and/or an assimilation feature 656. Other features may be included, making other versions of the maintenance engine that are more or less complex than what is shown in FIG. 6. The disk un-assimilation feature 652 may refer to an un-assimilation capability, as described previously. Selected storage resources may be removed from the system in that their associated data structures may be destroyed. The disk un-assimilation feature 652 may also refer to the placing of disks in a virtual maintenance mode to receive maintenance while the remainder of the system is functioning normally.

The maintenance feature 654 may refer to commands available to the module 130 to operate on storage resources placed in a virtual maintenance mode. These commands may be available as a set or library of functions already available to a filer, for example, to perform traditional maintenance where the entire system is brought down to run the maintenance commands. The maintenance feature 654 may refer to modifications to these commands. Alternatively, the maintenance feature 654 may refer to additional commands added to a filer to enable the filer to perform selective maintenance while the system is operational.

The assimilation feature 656 refers to functions related to incorporation of disks into the system. Under normal conditions an assimilation controller may bring all visible disks into the system. The assimilation feature 656 may provide limitations on which disks will be assimilated. For example, assimilation may be limited to newly added disks. The assimilation feature 656 may provide bookkeeping functions to the assimilation feature to track disks that are in maintenance mode to prevent them from being assimilated, and to provide for temporary, "special" assimilation for operations of commands that affect data structures.

The virtual maintenance module 130 may include hardware, software, and/or a combination of these. In a case where the virtual maintenance module 130 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, the filer 120, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above.

Figure 7:
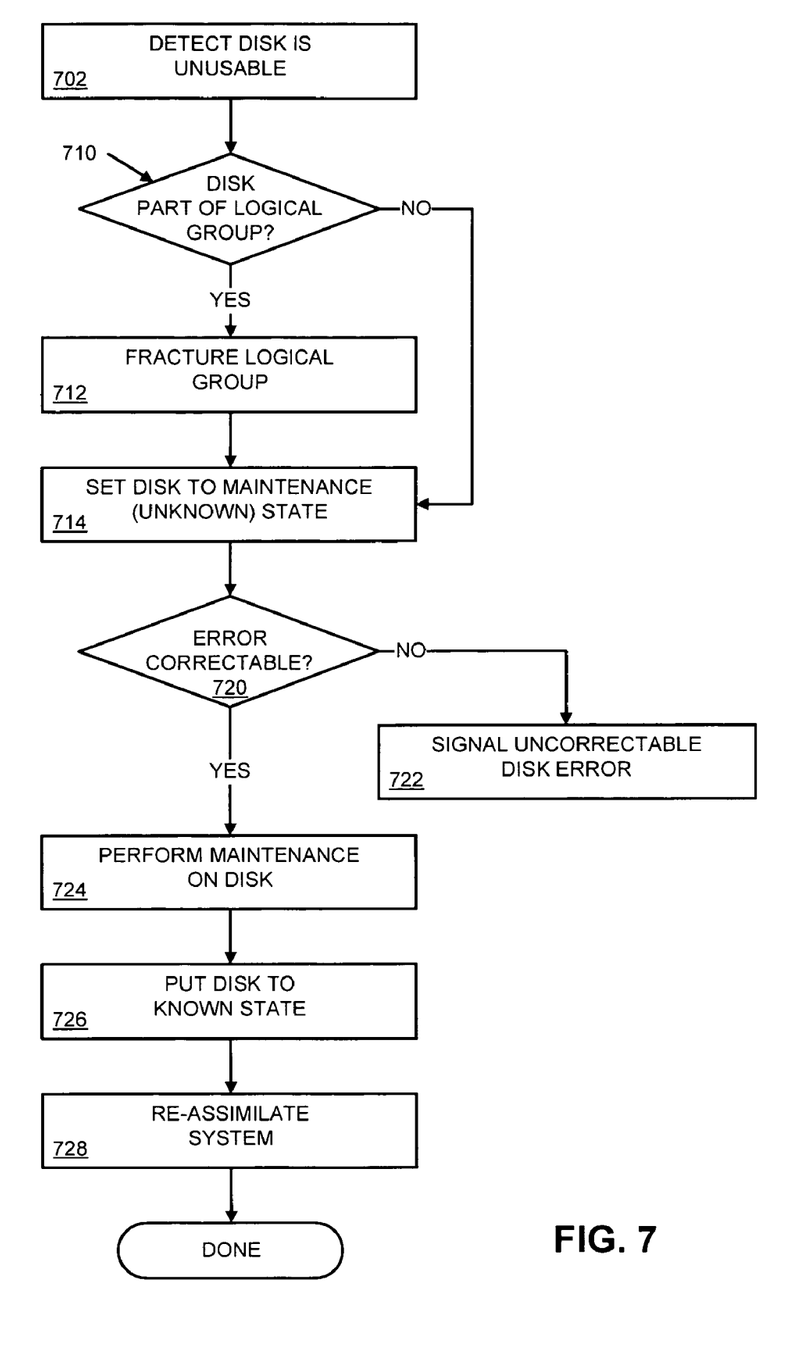
FIG. 7 is a flow diagram of an embodiment of performing maintenance on a disk.

FIG. 7 is a flow diagram of an embodiment of performing maintenance on a disk. A filer detects that a disk is unusable for data access routines (e.g., read, write), 702. The disk may be unusable because of improper (e.g., missing, corrupted) metadata. The filer determines if the disk is part of a logical group, 710. The logical group refers to data structures established by the filer to provide data storage structures (e.g., containers) for organizing how physical resources will be allocated. If the logical group is not one that includes the root volume, the filer may proceed to perform online disk maintenance. If a data structure including the root volume is affected, the system may have to be brought down to perform maintenance. If the disk is part of a logical group (e.g., aggregate), the logical group is fractured, 712. Fracturing the logical group refers to dissolving, disassociating, or otherwise breaking up a logical group. The logical group is a group of software objects joined together in an abstraction that associates the objects as corresponding to each other, or otherwise being associated. Fracturing the group refers to removing the association, and thus dissolving the group. For example, rules grouping the objects under an abstraction could be removed, objects defining the group could be invalidated or modified, etc. This may result in other disks in the logical group also being marked for maintenance, although there can be instances (e.g. disks in other plexes) when not all disks associated with this disk in the logical group are marked for maintenance.

If the disk is not part of a logical group (e.g., a spare disk), or when the group is fractured, the disk, and possibly all disks associated with the disk in the logical group, may be set to a maintenance or unknown state, 714. Note that although shown following the fracturing of the logical association, setting the disk(s) to an unknown state may occur prior to fracturing the logical group, or occur in conjunction with the fracturing process. In the unknown state, the disk(s) may be unusable to a dynamic assimilation module, preventing the disk(s) from being re-assimilated until maintenance has been performed.

The filer may determine if the error is correctable, 720. Some disk unusability errors may occur due to hardware malfunctions that render the disk inoperable. In such a case, the filer may signal an uncorrectable disk error, 722, and standard procedures of dealing with such disk problems may be performed. If the disk error is correctable (e.g., incorrect label information), the filer may invoke a virtual maintenance function/routine to perform maintenance on the disk, 724. The virtual maintenance function/routine may include issuing one or more commands to access and/or alter data on the disk, or on disks associated (e.g. through label data) with this disk. When the disk and all associated disks have corrected information, they may be placed back into a known state, 726, referring to a state known to the assimilation module. The assimilation module will then automatically re-assimilate the disk(s), 728, and incorporate the disk(s) back into a data structure, or as a spare, depending on its logical associations.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    determining that a storage device of a multi-device storage system is unusable within a logical group of storage devices due to an error with label data of the storage device that indicates an association of the storage device with the logical group to which it belongs, the error with the label data causing the storage device to have incorrect information about the association with the logical group, the storage system having multiple logical data containers defining logical groups of storage devices, each data container having software objects to represent the storage devices, where a property of a software object corresponds to a status of the represented storage device;
    logically isolating the storage device from the storage system, including isolating the storage device from the logical group to which the storage device belongs, while maintaining storage service access to another storage device in the storage system including maintaining the logical group online, the logically isolating including preventing the storage device from being assimilated into the storage system as a storage resource of a logical group;
    performing maintenance on the isolated storage device including modifying the label data on the storage device to indicate a correct association of the storage device with the logical group; and
    assimilating the storage device back into the storage system after performing the maintenance.

2. A method according to claim 1, wherein the storage device comprises a magnetic hard disk drive.

3. A method according to claim 1, wherein logically isolating the storage device comprises placing the storage device in a virtual maintenance state.

4. A method according to claim 3, wherein placing the storage device in the virtual maintenance state comprises changing a state of a software object representing the storage device to a state not recognized by the storage system.

5. A method according to claim 1, wherein logically isolating the storage device comprises fracturing a data structure containing a software object representing the storage device, the data structure representing the logical data container defining the logical group to which the storage device belongs.

6. A method according to claim 5, wherein fracturing the data structure containing the storage device comprises temporarily disassociating one or more software objects representing storage devices associated with the data structure.

7. A method according to claim 1, wherein modifying the label data further comprises issuing a maintenance command to determine a correct state of the label data.

8. A method according to claim 7, wherein issuing the maintenance command further comprises:

issuing a command that performs an operation on the storage device and an additional storage device determined to be part of the same logical data structure;

temporarily assimilating the storage device and the additional storage device to perform the operation; and removing the effects of the temporary assimilation upon completion of the operation.

9. A method according to claim 1, wherein logically isolating the storage device comprises un-assimilating the storage device from the storage system.

10. A method according to claim 9, wherein un-assimilating the storage device from the storage system further comprises:

determining if the storage device is contained within a logical data structure that includes other storage devices; and if the storage device is contained within a logical data structure, fracturing the logical data structure, and un-assimilating the storage device and the other storage devices associated with the logical data structure.

11. A method according to claim 9, further comprising:

determining if the storage device is contained within a logical data structure that includes a root data structure for the storage system; and un-assimilating the storage device if the root data structure is not included in the logical data structure of the storage device.

12. A method comprising:

assimilating storage units automatically and dynamically into an operational storage server system, the storage system having multiple logical data containers defining logical groups of storage units, each data container having software objects to represent the storage units, where a property of a software object corresponds to a status of the represented storage unit;

determining label metadata of a storage unit has an error, the label metadata defining a logical data structure associated with the storage unit to indicate a logical group to which the storage unit belongs, where the error with the label metadata causes the storage unit to have incorrect information about the association with the logical data structure, and prevents the storage unit from servicing data requests in the logical group;

marking the storage unit to isolate the storage unit from the logical group, and prevent dynamic assimilation of the storage unit into the operational storage server system; and while the storage server system, including the associated logical data structure and its associated storage units except for the isolated storage unit, is operational, editing label metadata on the storage unit defining the logical data structure associated with the storage unit.

13. A method according to claim 12, wherein marking the storage unit comprises flagging the storage unit in a memory accessible to the storage server system.

14. A method according to claim 12, wherein marking the storage unit comprises setting a state of the storage unit to a state unknown to the storage server system.

15. A method according to claim 12, wherein marking the storage unit further comprises determining that metadata on the storage unit defining a logical data structure to which the storage unit belongs is corrupted.

16. A method according to claim 12, further comprising restoring the storage unit to permit dynamic assimilation of the storage unit into the storage server system.

17. A method according to claim 16, wherein restoring the storage unit to permit dynamic assimilation comprises changing a state of the storage unit from a maintenance state to an operational state.

18. An article of manufacture comprising a machine accessible recordable/non-recordable medium having content stored thereon to provide instructions to result in an electronic system performing operations including:

logically mapping detected physical storage resources including a storage device, to provide a network storage system, the network storage system having multiple logical data containers defining logical groups of storage devices, where mapping associates storage resources including the storage device to logical groups of storage devices, the logical data containers having software objects to represent associated storage devices;

determining that the storage device has incorrect logical mapping data, which incorrect logical mapping data causes the storage device to having incorrect information about the logical mapping with a logical group to which the storage device belongs;

placing the storage device in a virtual maintenance mode to isolate the storage device from the logical group to which the storage device belongs, including flagging the software object representing the storage device to prevent the storage device from being assimilated into the network storage system;

operating on the storage device in the virtual maintenance mode to correct the logical mapping data; and incorporating the storage device back into the network storage system into the logical group to which the storage device belongs when the logical mapping data is corrected.

19. An article of manufacture according to claim 18, wherein determining the storage device has incorrect logical mapping data comprises determining that the logical mapping data of the storage device is missing or has incorrect values.

20. An article of manufacture according to claim 18, wherein removing the storage device from the network storage system further comprises:

determining what logical mappings in the network storage system contain the storage device; and destroying the logical mappings that contain the storage device.

21. An article of manufacture according to claim 18, wherein preventing the storage device from being incorporated into the network storage system comprises maintaining the storage device in a non-incorporable state.

22. An apparatus comprising:

a storage component having code to define operations including isolating an unusable disk of a storage system from data access commands while access is maintained to another disk of the storage system, servicing the isolated disk to restore metadata information on the disk, and incorporating the disk back into the storage system without rebooting the storage system, where the storage system has multiple logical data containers defining logical groups of disks, the logical data containers having software objects to represent disks of the logical groups, and where the isolated disk is part of a logical group of the storage system; and a processor coupled to the storage component to execute the operations defined in the code;

wherein isolating the unusable disk includes flagging the software object representing the disk to temporarily remove the disk from the logical group to which the disk belongs and prevent the disk from being assimilated into the network storage system; and wherein incorporating the disk back into the storage system includes removing the flagging of the software object representing the disk and incorporating the disk back into the logical group to which the disk belongs.

23. An apparatus according to claim 22, wherein isolating the unusable disk comprises modifying a code routine to incorporate the disk back into the storage system to prevent incorporation of the disk as long as it is flagged.

24. An apparatus according to claim 22, wherein the code to define servicing the isolated disk further comprises code to define a temporary incorporation routine to provide a temporary data structure on which a maintenance command may be executed.

25. A storage server comprising:

a processor;

a communications adapter coupled to a network to interface with a client over the network;

a storage adapter coupled to a mass storage subsystem to access one or more mass storage devices of the subsystem on behalf of the client;

a memory coupled to the processor having software, which when executed by the processor, causes the storage server to generate a logical organization of the storage devices through which the storage devices are accessible by the client, the logical organization including data containers having software objects to represent the storage devices and logical groups with which the storage devices are associated, and execute a process to remove one or more of the storage devices from the logical organization to prevent access to the storage device(s) while continuing to allow access to the other storage devices, edit metadata on the removed storage device(s) that identifies a position of the storage device(s) in the logical organization, including flagging the software object(s) representing the removed storage device(s) to temporarily isolate the storage device(s) from the logical group(s) to which they belong and prevent the storage device(s) from being assimilated into the subsystem while the storage device(s) is/are flagged, and allow the client to access the storage device(s) when the metadata is edited.

\* \* \* \* \*